(12) United States Patent
Yavas et al.

(10) Patent No.: US 11,487,038 B2
(45) Date of Patent: Nov. 1, 2022

(54) OPERATING METHOD OF A METAL DETECTOR CAPABLE OF MEASURING TARGET DEPTH

(71) Applicant: NOKTA MUHENDISLIK A.S., Sancaktepe/Istanbul (TR)

(72) Inventors: Basri Kutlu Yavas, Sancaktepe/Istanbul (TR); Mehmet Onlek, Sancaktepe/Istanbul (TR)

(73) Assignee: NOKTA MUHENDISLIK A.S., Sancaktepe/Istanbul (TR)

( * ) Notice: Subject to any disclaimer, the term of this patent is extended or adjusted under 35 U.S.C. 154(b) by 41 days.

(21) Appl. No.: 17/254,114

(22) PCT Filed: Jun. 21, 2018

(86) PCT No.: PCT/TR2018/050313
§ 371 (c)(1),
(2) Date: Dec. 18, 2020

(87) PCT Pub. No.: WO2019/245487
PCT Pub. Date: Dec. 26, 2019

(65) Prior Publication Data
US 2021/0255351 A1  Aug. 19, 2021

(51) Int. Cl.
*G01V 3/10* (2006.01)
*G01B 7/26* (2006.01)
(Continued)

(52) U.S. Cl.
CPC ............... *G01V 3/10* (2013.01); *G01B 5/24* (2013.01); *G01B 7/26* (2013.01); *G01B 11/002* (2013.01); *G01B 21/08* (2013.01); *G01V 3/081* (2013.01)

(58) Field of Classification Search
None
See application file for complete search history.

(56) References Cited

U.S. PATENT DOCUMENTS 4,507,612 A  3/1985 Payne
4,542,344 A  9/1985 Darilek et al.
(Continued)

FOREIGN PATENT DOCUMENTS

JP  H06-289146 A  10/1994
WO  2006/037176 A1  4/2006
(Continued)

OTHER PUBLICATIONS

Zeng Haishan et al.; Methods and Apparatus for Contemporaneous Fluoresence and Reflectance Measurements With Multiple Measuring Devices; WO 0250518 A2; Date Published Jun. 27, 2002; (Year: 2002).*

(Continued)

*Primary Examiner* — Nasima Monsur
(74) *Attorney, Agent, or Firm* — Merchant & Gould P.C.

(57) ABSTRACT

The present invention, thanks to the horizontal positional tracking unit (20)—mounted to a hand-held metal detector (10)—consisting of optical flow sensor lens (22), an optical flow sensor camera (21), an optical flow sensor processor (23), a height sensor (24) and an IMU sensor (25); allows the calculation of the depth of the target (60) by tracking the horizontal position while the user freely sweeps the search head (11) of the metal detector (10) with the "optical flow" method and using the metal detection signals received from many point positions around the detected target center with this position; so it relates to a method of measuring a target depth and a metal detector using this method, which allow calculation to be made independently of the type and practical the size of the metal.

6 Claims, 5 Drawing Sheets

(51) Int. Cl.
  *G01V 3/08*   (2006.01)
  *G01B 5/24*   (2006.01)
  *G01B 11/00*  (2006.01)
  *G01B 21/08*  (2006.01)

(56) References Cited

U.S. PATENT DOCUMENTS

| | | | |
|---|---|---|---|
| 4,691,165 | A | 9/1987 | Szedlmajer |
| 5,786,696 | A * | 7/1998 | Weaver .................. G01V 3/15 324/243 |
| 6,853,194 | B2 | 2/2005 | Nelson et al. |
| 7,265,551 | B2 | 9/2007 | Kellermann |
| 2013/0002854 | A1 | 1/2013 | Nielsen et al. |
| 2016/0041292 | A1* | 2/2016 | Wahrlich ................ G01V 3/10 324/329 |
| 2017/0102467 | A1* | 4/2017 | Nielsen .................. G01S 19/47 |

FOREIGN PATENT DOCUMENTS

| | | |
|---|---|---|
| WO | 2007/147199 A1 | 12/2007 |
| WO | 2019/135726 A1 | 7/2019 |

OTHER PUBLICATIONS

International Search Report and Written Opinion of the International Searching Authority for International Patent Application No. PCT/TR2018/050313 dated May 17, 2019, 12 pages.

* cited by examiner

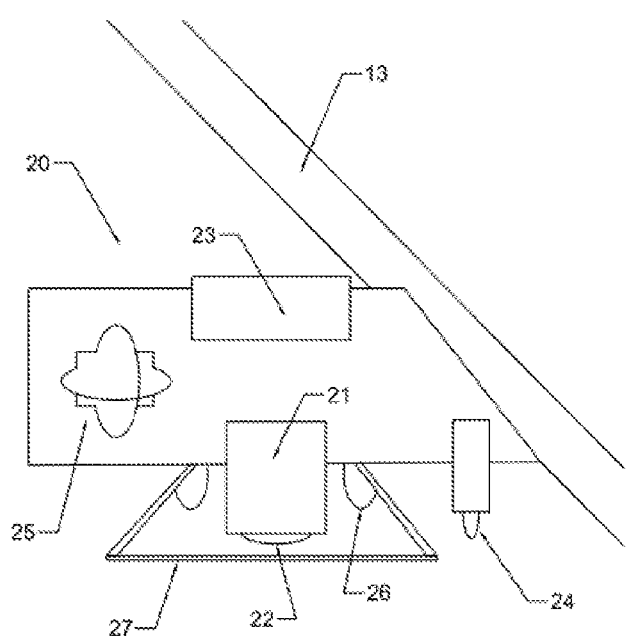
Fig. 2
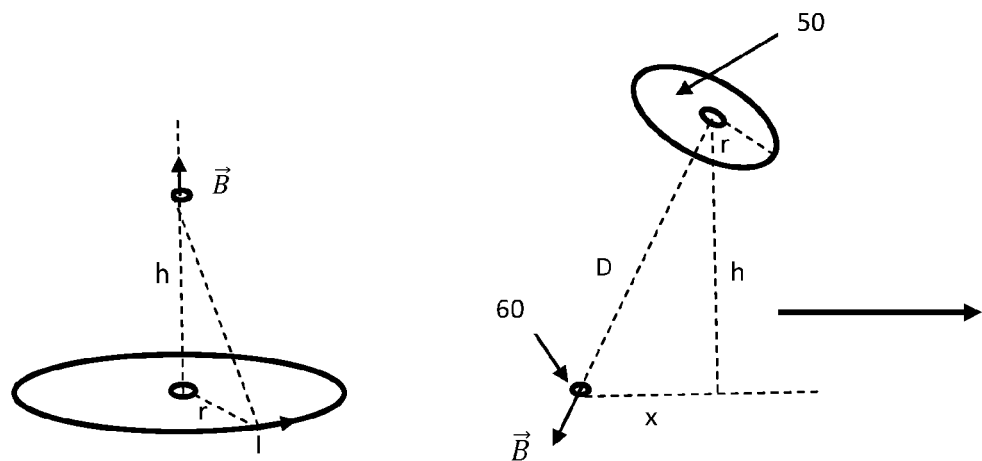
Fig. 3
Fig. 4

OPERATING METHOD OF A METAL DETECTOR CAPABLE OF MEASURING TARGET DEPTH

CROSS-REFERENCE TO RELATED APPLICATIONS

This application is a National Stage Application of PCT/TR2018/050313, filed 21 Jun. 2018, and which application is incorporated herein by reference. To the extent appropriate, a claim of priority is made to the above-disclosed application.

TECHNICAL FIELD

The present invention relates to a hand-held metal detector which can measure the depth of metallic objects (targets) buried underground or under an obstacle according to the underlying soil (ground) or obstacle surface and the method of depth measurement conducted by means of said detector. The invention provides the calculation of the target depth regardless of the metal type and its practical size, thanks to a horizontal position tracking unit operating with an "optical flow" method, and using this position data with the metal detection signals received while tracking the horizontal position of metal detector search head moved by the user on the ground. The invention can be carried out with the use of only a single receiver coil as opposed to similar solutions in the prior art and can be used in conjunction with any detector capable of obtaining standard search heads and metal data, since there is no need to use multiple and special coils for this purpose.

PRIOR ART

The depth of a target detected by metal detectors plays an important role in the decision phase of the excavation work for the target. Excavation for every identified target is both time-consuming and exhausting for the person performing the search and harmful to the environment.

During a metal search, the estimate of the target depth is effective in two ways. One of these is the choice that can be made depending on whether the target is generally worth taking out. Thanks to this choice, the user may find it more convenient in terms of time and value to look for other targets rather than dealing with a deep target. The second is that the searched target type is related to the possible depth. For example; if a single coin is sought, it is unlikely that a target very deep is single coin. However, deep targets are of interest if, for example, treasure is searched. Treasure-type targets are usually relatively large-sized and located in deep.

Knowing the depth of the target gives an idea about the probable duration of excavation work and depth of excavation. Existing metal detectors can give false alarms due to environmental factors, soil effects, surface geometry, stone and rock structures, and this probability increases in proportion to the depth of the possible target. If the detector user can not obtain information about the depth or if the depth information obtained is incorrect; the ground may have been excavated for erroneous detection, or it may be time-consuming to reach a very deep target.

In the current art; there are methods of measuring the depth of a known target by means of a static arrangement and setup (including electromagnetic setup). These methods, however, is not suitable for general purpose metal search operations but rather solves the problem of a more specific industry.

In the known art; Ground Penetrating Radar (GPR) devices are available to measure underground depths. The depth measurement processes of these devices are not target-oriented like metal detectors. In GPR type devices, not the target depth but the layer depth concept is incorporated. The purpose of these devices is to reach and analyze the structure under the ground. Such devices are not sensitive to relatively small targets as they are not selective in terms of metal-specific qualities. In other words; it is not efficient to use current GPR devices as "general metal targeting" detectors except for exceptional targets.

In the present art, in handheld metal detectors, the intensity of the signal received from the target varies with an inverse proportion to the distance of the target. Thus, metal detectors can predict the depth of a target with a basic approach, from the signal intensity (maximum or average value) they receive. This estimate is carried out with a target assumption of size and type assumed to be constant (e.g. for a pre-calibrated for a metal coin). When the size of the target is different and/or its type changes, this prediction method loses its ability to be accurate.

Current metal detectors can also predict the metal type of the target. With the use of the target type data, an estimate of the depth, which can be made from the metal intensity, can be based on previously defined scales according to the targets in different metal types. After metal type detection; it is possible to determine the target depth by using the scale of the target concerned. However, in existing detectors, as the depth of the metal increases (for the targets at the limit), the predictability of its type decreases. This causes harder determination of depth in the target and soil structure diversity. In addition, since it is necessary to define a different scale for each target type, this method is not feasible when the target does not consist of limited options.

There are applications in the current art that use a height measuring sensor in combination with metal detectors. For example; An optical detector (distance detector) is used for determining the height from the ground in the mine detector described in the patent document entitled "Metal Detector, in Particular Mine Detector" with U.S. Pat. No. 7,265,551. The solution mentioned in the patent document numbered U.S. Pat. No. 7,265,551; the detector is intended to determine the height from the ground of the search head.

In the current art, depth discovery operation is described in the patent document entitled "Metal Detector Systems for Identifying Targets in Mineralized Ground" numbered U.S. Pat. No. 4,507,612. However, this is done by starting from the signal magnitude. For this reason, it gives variable results depending on the size of the target and the type of target.

In the known art, there is the patent document numbered U.S. Pat. No. 5,786,696 entitled "Metal Detector For Identifying Target Electrical Characteristics, Depth And Size". In the mentioned document, it is aimed to establish an analogy between target existence, type, size and depth by taking into account the size difference between the two receiver coils in the search head. This method implicitly involves the above-mentioned "depth determination using a different scale according to the type of target detected" method. In order for the depth determination method of U.S. Pat. No. 5,786,696 to give results in the desired efficiency, it is necessary to find a relationship between target types, size and diversity, which allows depth inference.

In patent document U.S. Pat. No. 4,691,165 entitled "Method and Apparatus Including Spaced Antennas for Determining the Trace and Depth of Underground Metallic Conductors", method of depth detection is described using two receiver coils (antennas) that one of them can be rotated.

In patent document numbered U.S. Pat. No. 4,542,344 and entitled "Detecting Buried Pipeline Depth and Location with Electromagnetic Triangulation" a method and device developed for measuring the depth of pipelines are mentioned. In this document, depth measurement by triangulation method is explained by placing transmitters and receivers in a wide geometry according to the target. Triangulation in the known art, is a method used in many geometric locating applications. In document U.S. Pat. No. 4,542,344, the solution of finding the depth of pipelines is presented. There is no mention of any solution to the depth of objects (targets) with different forms.

In patent document entitled "Electromagnetic Target Discriminator Sensor System and Method for Detecting and Identifying Metal Targets" numbered U.S. Pat. No. 6,853, 194B2; a method for finding the depths of mines is mentioned. The basis of this method is the statistical data obtained according to the typical depths of mines and time constants. There is no solution for measuring the depth of any random metal target.

In patent document numbered PCT/TR2018/050007, entitled "Metal Detector Capable of Visualizing the Target Shape", a handheld metal detector that allows you to identify the shape of the buried target is mentioned. In patent document numbered PCT/TR2018/050007, the data obtained from the sensors integrated in the metal detector is subjected to a method for visualizing the target.

In this invention entitled "Metal Detector that can Measure the Target Depth and its Operating Method"; depth detection was carried out with the use of sensors mentioned in patent application numbered PCT/TR2018/050007, without target visualization process. Depth detection method can be independent; can also be used together with the visualization method.

Short Description of the Invention The present invention relates to a method and a metal detector for performing geometric/analytical target depth calculation by interpreting the obtained metal detection signals and the horizontal position geometry relative to the signal, together in a specific area, utilizing a positional tracking unit mounted on a handheld metal detector The invention essentially uses following information;

Horizontal position of the detector on the ground
Numerical measurement equivalences of target metal signals
Characteristic geometry of search head, to combine this information with analytical and numerical methods. The height measurement feature of the position measuring unit is also used in the basic calculations.

Signal magnitude and target type information on the target metal is obtained instantly by means of metal detection method of the metal detector in the known art.

The position of the search head on the ground is continuously detected and monitored by the horizontal position measuring unit. The location tracking of the search head is performed by "optical flow" method. It is inevitable that the optical flow sensor integrated in the metal detector causes axis and elevation changes in the ground view, due to the intentional or unintentional hand movements of the user. At least one contactless distance sensor providing height measurement to detect elevation changes, and gyroscope, accelerometer and magnetometer combination (IMU) sensors are used to detect angular displacements resulting from axial movements.

Acquired signal magnitude samples for the target metal and information about the position of the search head on the ground, together with the geometry of the search head; are processed in an electronic processor that is internal or external to the metal detector. Such processes may be performed in a single device or may be performed in separate processor units that are interconnected or have wire/wireless communication.

The process begins by reading the target metal and position information from the sensors and locating the received data in a position matrix during motion, and with the interpolation of the positions of the matrix which do not contain metal information. The first and second derivatives of the signal intensity along the horizontal axes are taken. Depth calculations are carried out by finding the distance between the minimum and maximum peaks of the first derivative in the relation between the points where the derivatives are equal to zero. Errors due to geometric complexity with respect to the calculated depth are corrected by means of the function defined in relation with the "search head" and the final information about the depth is created and presented to the user.

DESCRIPTION OF THE INVENTION

In this invention, a metal detector for obtaining data relating to the metal target is a device that the user uses by holding and free-scanning movements. Ground tracking is realized by "optical flow" based method by means of a horizontal position measuring unit during the free movements of metal detector, hence the search head. For this method, at least one optical flow sensor is used, which includes a camera or optical sensor and tracks the position by the shift in the detected image. The optical flow sensor is supported by different sensors for correcting faults caused by mechanical movements in the information related to the position, and the multi-sensor combined sensor group with the optical flow in the center constitutes the horizontal position measuring unit.

Said horizontal position measuring unit may be fixed to a section that moves along with the search head in the metal detector, or directly to the search head or the shaft holding the search head or to other moving handheld electronic units. In the basic application of the present invention, the sensor group is mounted in the metal detector shaft.

An optical flow sensor can only measure the direction and amount of movement that occurs in the axis of the image sensor. When the optical flow sensor is rotated by the user's hand movements, the displacement it measures is relative to its axis, not to the actual ground. In a handheld metal detector, the axis of the optical flow sensor will change continuously. In order to eliminate these changes; the axis of the sensor in the direction of the plumb line (yaw) must be continuously measured and followed. The axial (angular) and elevation changes caused by the intentional or unintentional hand movements of the user in detecting the ground motion by the optical flow sensor integrated in the metal detector are corrected with the IMU sensor and the height sensor.

The above-mentioned mechanical condition also applies to vertical axis movements. When the user does not keep the detector in full parallel or when there is any axial movement; it is possible to make angular corrections (relative to gravity) from the data obtained from the accelerometer located in the horizontal position measuring unit.

Details of the correction calculations are not provided in the specification because the position reading of the horizontal position measuring unit is calculated by simple geometric methods and because it does not have a direct relation with the application. At least one height sensor providing contactless height measurement to detect elevation changes, and gyroscope, accelerometer and magnetometer combination (IMU) sensors are used to detect angular displacements resulting from axial movements.

The search head of a metal detector consists of separate magnetic field transmitter and receiver coils or an antenna wound as a single transceiver coil. While the transceiver within a search head is also dependent on the coil structure, it achieves the highest metal signal magnitude on average when it is exactly above the target. The signal magnitude gets weaker when moved away from the point where target is located, and becomes so weak that it can be neglected after a certain distance. The function of the signal strength depends not only on the distance to the search head in general, but also on the vector geometry formed by the coils in the search head and the target. Variations in the coil and target geometry do not allow the signal strength to be determined by a clear analytical model/function, but the magnitude of the signal to be generated by the magnetic field is expressed by basic magnetic field theories such as the Biot-Savart Law, Ampere Law, Faraday Induction Law and mathematical relationships under certain assumptions can be established.

In order to determine the depth of a detected target, the relationship between the metal detector signal and the geometry must be established, the search head position according to the target must be known, and the position must be tracked with the signal. It is a subject of the invention to identify and systematically express search position information according to the target.

Associating the signal magnitude detected by the detector with the position and depth information generation steps are performed by way of the relations between the first and second derivatives of the signal according to the position. These relations are described in the scope of the specification based on verification of exceptions with known basic laws of physics, analytical geometry and numerical solutions.

The present invention is, therefore, are described in more detail by way of references, with reference to the figures and graphics listed below:

DESCRIPTION OF THE FIGURES

FIG. 2: Integrated position tracking unit, detailed view.

FIG. 3: An ideal coil-target representation showing the formation of magnetic field vector "B" formed as a result of shifting by "D" at the height "h" of a single-turn circular coil whose radius is "r" and through which current "I" passes, parallel to the ground surface created by its own area.

FIG. 4: An ideal coil-target representation showing the formation of a magnetic field vector "B" at the distance "D" resulting from shifting by "x" at the height "h" parallel to the ground of a single-turn circular coil whose radius is "r" and through which current "I" passes (not shown in the figure) as there is the target on its normal center.

DESCRIPTION OF REFERENCE NUMBERS

Figure 1:
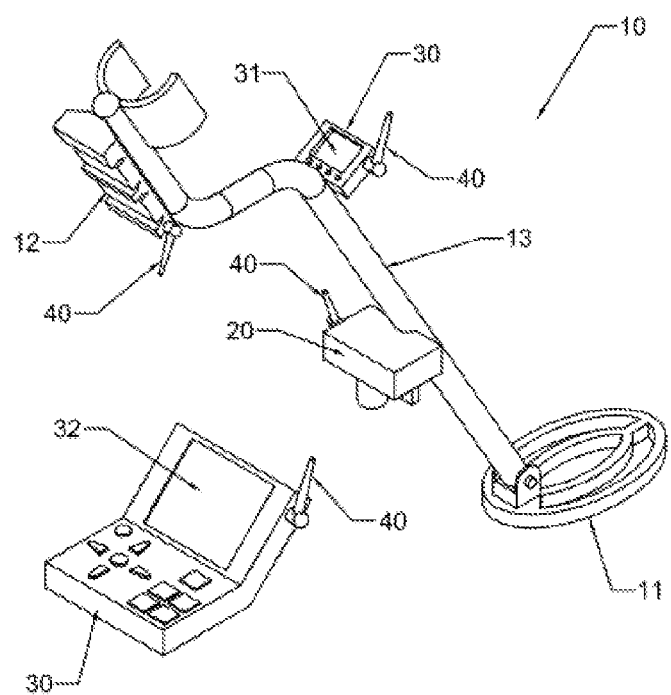
FIG. 1: The general perspective view of the metal detector that can measure the target depth.

NO PART NAME
10 Metal Detector
11 Search head
12 Signal processing system
13 Shaft
20 Positional Tracking Unit
21 Optical Flow Sensor camera
22 Optical Flow Sensor lens
23 Optical Flow Sensor processor
24 Height sensor
25 IMU sensor
26 Infrared lighting device
27 Cold mirror
30 Graphics processing/display unit
31 Display
32 Screen
40 Antenna
50 Coil
60 Target

DETAILED DESCRIPTION OF INVENTION

The present invention, thanks to the horizontal positional tracking unit (20) mounted to a hand-held metal detector (10)—consisting of optical flow sensor lens (22), an optical flow sensor camera (21), an optical flow sensor processor (23), a height sensor (24) and an IMU sensor (25); allows the calculation of the depth of the target (60) by tracking the horizontal position while the user freely sweeps the search head (11) of the metal detector (10) with the "optical flow" method and using the metal detection signals received from many point positions around the detected target center with this position; so it relates to a method of measuring a target depth and a metal detector using this method, which allow calculation to be made independently of the type and practical the size of the metal.

In the preferred embodiment of the invention, the positional tracking unit (20) is connected to the shaft (13) of the metal detector (10). A cold mirror (27) filter and preferably infrared illumination elements (26) are used to prevent the optical flow process from being affected by ambient light.

There is a detector (10) signal processing system (12) which enables the metal detection process to be carried out electronically is linked to the search head (11) which will transmit metal signals; there is also an internal and/or external graphics processing/display unit (30) which can display the metal signal results to the user. The graphics processing/display unit (30) can be either on the shaft (13) or as an external unit. In particular, if it is external; it can be connected to the signal processing system (12) via radio antennas (40) or directly via cable. The results can be presented to the user on a graphic screen (32) or on the display (31).

The calculations of the described method can be performed in the processors in the internal and/or external graphics processing/display unit (30) as well as in a mobile phone, tablet, computer and similar screens (32) and a mobile device with a computing power.

Said target depth measurement method;

Collection of location information of the search head (11) on the ground by means of the optical flow sensor, simultaneously with the collection of presence/signal intensity information of the target metal via the metal detection unit of the metal detector (10);

Detection and correction of height variations due to the user's hand movements and ground irregularities with the height sensor (24) during the collection of position information;

Detection and correction of axial changes caused by hand movements of the user during the collection of position information with the gyroscope, accelerometer and magnetometer combination IMU sensor (25);

Transferring the metal data and corrected position information into the target signal-position matrix;

Constructing the missing signal data in the matrix by interpolation;

Construction of first derivative and second derivative tables according to the horizontal position (X and Y) with respect to the ground;

Determination of zero crossing points in the first derivative and second derivative tables;

Finding horizontal mean distance between the point that makes the second derivative zero and the point that makes the first derivative zero;

Correcting the nonlinearity errors of the calculated distance by using the inverse function of a function defined by the test targets relative to the coil and displaying the corrected values to the user;

consists of the above operating steps.

The magnitude of the metal detection signal that a metal detector (10) is acquiring at a particular location is a result of the magnetic field generated by the target metal detector (10). In a conductive target, rotational Eddy currents are induced which are proportional to the time derivative of the magnetic field introduced into the field by the metal detector (10). Counter magnetic field to be generated by these currents can be measured by the receiving coil of the metal detector (10). This time-varying field can be generated by the detector (10) as a sinusoidal continuous magnetic field or a magnetic field pulse. Whether generated by a continuous sinusoidal source or created by a magnetic pulse, the physical geometry of the magnetic field is the same. Standard type metal detectors perform the operation on this signal instantly and provide metal information to the user. A standard detector does not record the intensity of the metal detection signal relative to the position and process this signal according to the horizontal and vertical geometry. The basic difference of the invention according to the known art is the expression of the signal magnitude in relation to the position.

The graph of the signal according to the position will be independent of time, user's speed and movement. By virtue of the height sensor (24) and the IMU sensor (25), which cooperate with the optical flow sensor independently of variations caused by the user's movements when there is a variation depending on the user's movements.

In the method subject to the invention, the signal from the metal is expressed as part of the search head (11) geometry and target geometry, and the target depth is determined by utilizing this geometry.

The signal graph relative to the position will occur (the horizontal X and Y displacement dimensions and the magnitude values taken therefrom) as three-dimensional for a two-dimensional surface during the movements of the detector (10) search head (11). The three-dimensional graphic is created assuming that the height of the search head (11) relative to the ground has not changed during the movement. As a fourth dimension it is possible to take the height of the search head (11) from the ground separately for each location and to apply the calculation method to this data as well.

The distance relation between the search head (11) and the target relates to the magnetic field generated by the search head (11) and taken from the target. The search heads (11) with different shapes and detail will form a different distance relation. Also; depending to the shape of the search head (11), the corresponding function can become relatively complicated. However, it is possible under certain assumptions to express this function analytically in the light of fundamental laws of magnetic fields. This relationship needs to be calculated on the basis of the geometry of the target (60) of a coil (50) used as a magnetic field transmitting antenna in the search head (11).

The magnetic field that a magnetic source (transmitter) will create at a certain distance from itself is expressed as "B". This "B" magnitude can be measured by a receiving coil (50). Biot-Savart's law defines the magnetic field at a certain distance from the point which an electric 3D current passing through a conductor. The electric current flowing along a differential length "dL" is expressed inversely proportional to the square of the distance from the vectorial magnetic field to the electric current source, which will form at a certain distance from this location. As a differential value, magnetic field can be expressed as $$dB = \frac{\mu_0 \cdot I}{4\pi} \cdot \frac{\vec{dL} \cdot \vec{1_r}}{r^2}. \qquad [I]$$

Where "B" is the magnetic field, "µ0" is the permeability of the vacuum, "L" is the differential length of the direction of the current, "$1_r$" is the unit vector in the direction of the position where the magnetic flux occurs with the differential point and "r" is the scalar distance between these two positions. Along the geometry of an entire single turn circular coil (50) (FIG. 3), when the integral of differential magnetic fields are taken for target (60) at a distance "D" from the axis of the center of this coil (50), the magnetic field strength formed at the target (60) may be written as $$B = \frac{\mu_0 \cdot I}{2} \cdot \frac{r^2}{\left(D^2 + r^2\right)^{3/2}}, \qquad [II]$$

where "r" is used for the diameter (different from previous notation) of the coil (50), and "D" is the distance from the center of this coil (50) to the point at which the magnetic field is obtained.

With the assumption that the perpendicular passing through the center of this coil (50) is in the same direction as the target (60), so that the height of the coil (50) remains constant at "h" from the ground, if we express the distance between coil (50) center and target (60) as "D" when it is moved "x" much parallel to the ground, according to the trigonometry, we can write $D^2=x^2+h^2$ (FIG. 4). The magnitude of the magnetic field generated in horizontal "x" position may be expressed as $$B = \frac{\mu_0 \cdot I}{2} \cdot \frac{r^2}{\left(\left(x^2 + h^2\right) + r^2\right)^{3/2}}. \quad \text{[III]}$$

It can be seen that, as the coil (50) moves facing to the target (60), the second derivative of "B" relative to "x" position becomes $$\frac{d^2 B}{dx^2} = \frac{\mu_0 \cdot I}{2} \cdot \frac{3 \cdot r^2 \cdot \left(4x^2 - \left(h^2 + r^2\right)\right)}{\left(x^2 + \left(h^2 + r^2\right)\right)^{7/2}}. \quad \text{[IV]}$$

This is especially important in calculating the distance of the target since $x^2=(h^2+r^2)/4$ on the numerator part of this expression will cause it to be equal to zero. Where "r" is a constant, "h" is resulting magnitude, and "x" is the measured magnitude. It will suffice to calculate depth with $h=\sqrt{4x^2-r^2}$ [V] using the numerical methods on signals proportional to "B" taken according to the position.

Figure 5:
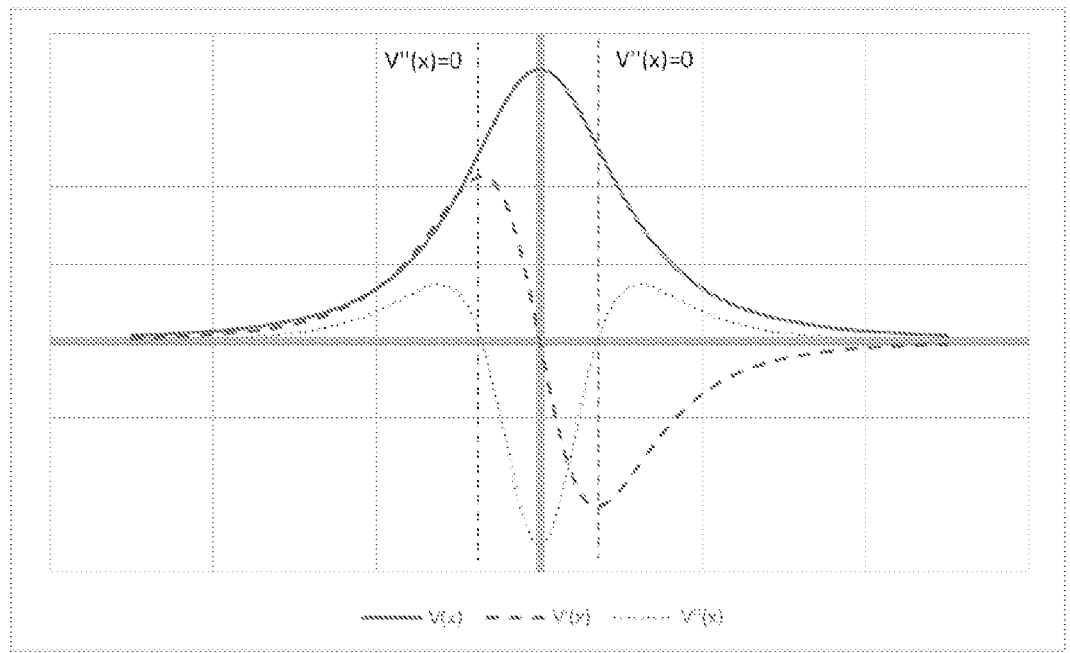
FIG. 5: Graphical representation of "V(x)" which is signal generated by the magnetic current, depending the horizontal position of "x" affecting on the target of the geometry in FIG. 4. The first derivative of this signal shown, expressed as "V'(x)" and the second derivative of the signal expressed as "V''(x)" drawn with the intersection and peak indication lines.

If we express the proportional electromotor force (voltage) to be generated by the magnetic field "B" as "V", the position the position making the first derivative zero can be determined by numerical methods (for example, by the finite difference method) from the data obtained by changing the "x" on the target (60), the position exactly on top of the target (60) can be found (FIG. 5). This position will be expressed as x=0 position (center) due to symmetry. It is possible to find the position making the second derivative graph zero using the data acquired (or data intervals taken). This value is equal to the solution of the equation [V] which makes the analytically specified function [IV] zero. The distance of the target (60) to the coil (50) movement surface can be found when "x" is determined this way and substituted in its place in equation [V], and also "r" which is a constant as the coil (50) radius. The depth of the target (60) will be calculated independent of other characteristics of the target (60) when the coil (50) to ground distance, which is also measured by the system, is subtracted from this distance. As can be seen, there is no real solution set for this case since the square root would be negative if "r" is smaller than (r/2). Theoretically, the "h" value can be calculated up to (r/2) distance. Practically, this is not a problem because the target depth will be deeper than the coil diameter of the detector (10).

The specified calculations assume the following basic assumptions.

The coil (50) is round, and transmitter coil (50) and receiver coil (50) are placed on the same axis The Eddy current generated by the magnetic field (B) generated by the coil (50) will be linearly detected by the electronic receiver as (V) equivalent The coil (50) passes over the target (60) only in one dimension The axis passing through the center of the coil (50) will be in the direction of the target (60)

In some detector search heads (11) the coils are circular and the transmitter and receiver are concentric. The concentric coil (50) is therefore seen more suitable for calculations of depth measurement. The metal search heads (11), which are generally referred to as "Double D", which generally have better results in terms of the induction balance, receiver and transmitter coil centers are not the same and the coils shapes are like letter D, In the context of the invention, this geometrical defect will be assumed as practically negligible in calculations.

The signal received from the target by the receiver coil will be affected by the target to coil distance and cause a distance error. This error is neglected with the assumption that the target distance is greater than the half of the coil radius (r/2) in the present invention, and the decrease in signal magnitude to occur in the receiving coil is included in a linearization calculation.

The search heads (11) of the metal detector (10) are used by the user for drawing an arc line parallel to the floor as an extension of the user's arm, unless otherwise specified. It is assumed that all the equations given for the distance have just one axis and that the target is passed over directly. In practice, such use is not possible. For this reason, in the system of the invention, a two-dimensional matrix (X and Y) representing the surface of the ground is placed after the position-signal data is taken in raw form. For the consistency of the calculation, it is possible to obtain the peak points from the three-dimensional graph on the X and Y axes. However, instead of sweeping in the form of an arc, it is also possible to obtain practical results with a search head (11) without the need to use such a matrix, which is moved right-to-left in a short space specific to the target area, and also allows for the implementation of the basic method in systems with lower computing power.

Keeping the center of the coil (50) towards the target (60) is practically not possible using a typical metal detector, the coil (50) is moved parallel to the ground. This means that the position of target (60) will be apart from a horizontal distance to the central axis of the coil (50) that is the "B" that the coil (50) generates on the target (60) will change and be expressed in more complexity. As the Biot-Savart law is applied to such a geometry, using the cylindrical coordinates, the result will require the solution of the following integral. Here, the X and Y axes do not refer to the previous "x" value, the motion is in the Y axis direction.

$$\vec{B} = \frac{\mu_0 I R}{4\pi} \int_0^{2\pi} \frac{h \cdot \cos\emptyset \cdot \vec{x} + h \cdot \sin\emptyset \cdot \vec{y} + (r - D \cdot \sin\emptyset) \cdot \vec{z}}{\left(r^2 + h^2 + D^2 - 2 \cdot D \cdot r \cdot \sin\emptyset\right)^{3/2}} d\emptyset \quad \text{[VI]}$$

Where "$\mu_0$" is the permeability of the vacuum, "I" is the current flowing through the coil (50), "r" is the radius of source coil (50), "h" is the vertical distance from the coil (50) center, "D" is the distance to the perpendicular line passing from the coil (50) center. The "Ø" in the equation is the angle of the rotation along the coil (50) to take the integral of the current in the cylindrical coordinates. X, Y, Z vectors in equation [VI] are Cartesian unit vectors in directions of "B".

Since the center is shifted from the symmetry axis in the cylindrical coordinates, different from a coil (50) held in the direction of the normal continuous target (60), the "B" field will be distributed in the Y and Z directions by the vector when integral is taken, resulting in zero in the X direction due to the symmetry.

This integration is known as an elliptic integral which is the subject of Cartesian coordinate relations with cylindrical coordinates, and these integrals do not compose very simple analytical expressions.

The difficulty in creating analytical expressions for "B" and the amount of error that will occur are tested in numerical methods within the invention. The magnitude plots of "B" obtained by taking numerical integral in function [VI] for each position are obtained as graphs for different values of radius "r".

Figure 6:
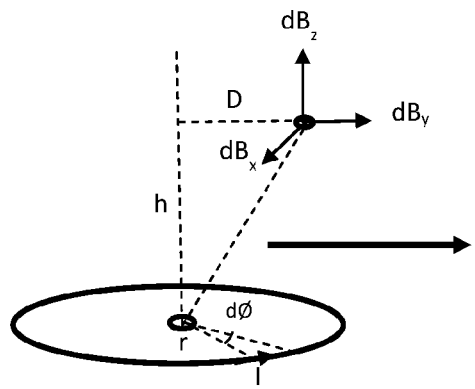
FIG. 6: An ideal coil-target representation showing a magnetic field vector "B" at the target distance resulting from shifting by "D" at the height "h" parallel to the ground surface generated by a single-turn circular coil whose radius is "r" and through which current "I" passes.
Figure 7A:
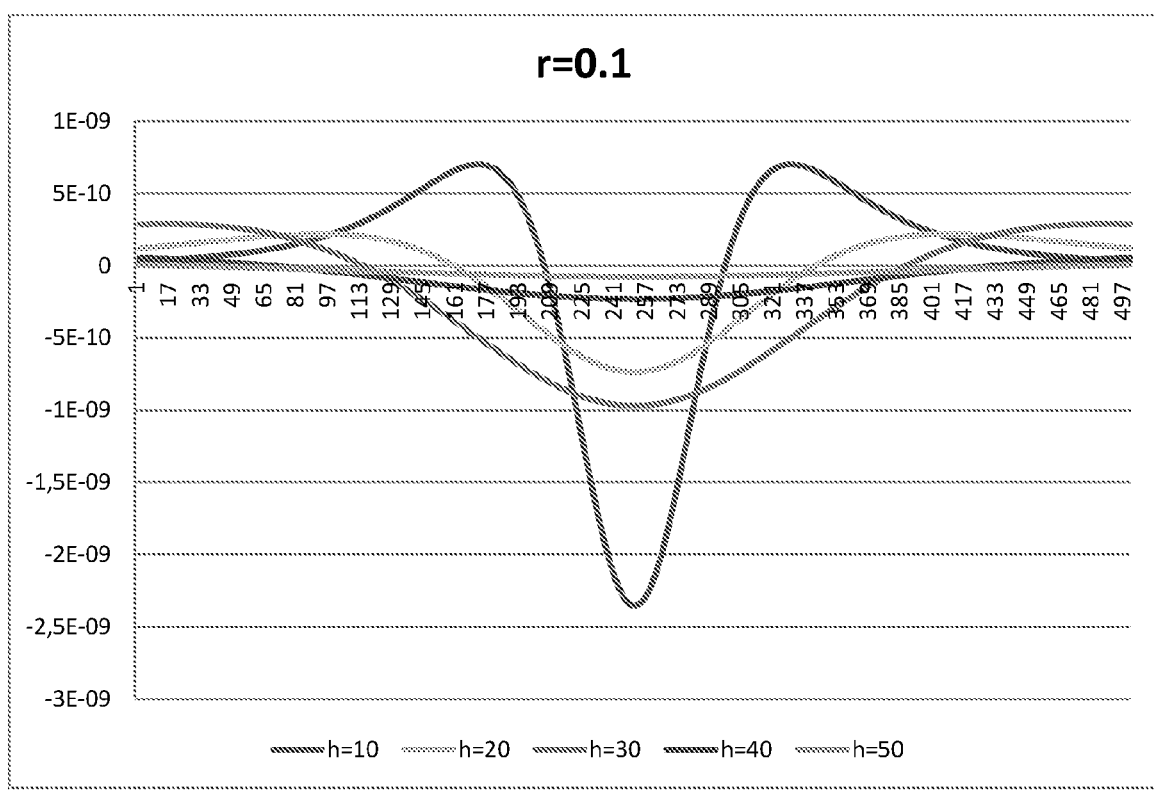
FIG. 7a,7b: Graph of numerically calculated values between h=10 units and h=50 units for "r=0.1 unit" (FIG. 7a) and "r=19 units" (FIG. 7b) of the second derivative according to the signal "D" to be generated by the magnetic field coil on the same target by a circular coil in FIG. 6.
Figure 7B:
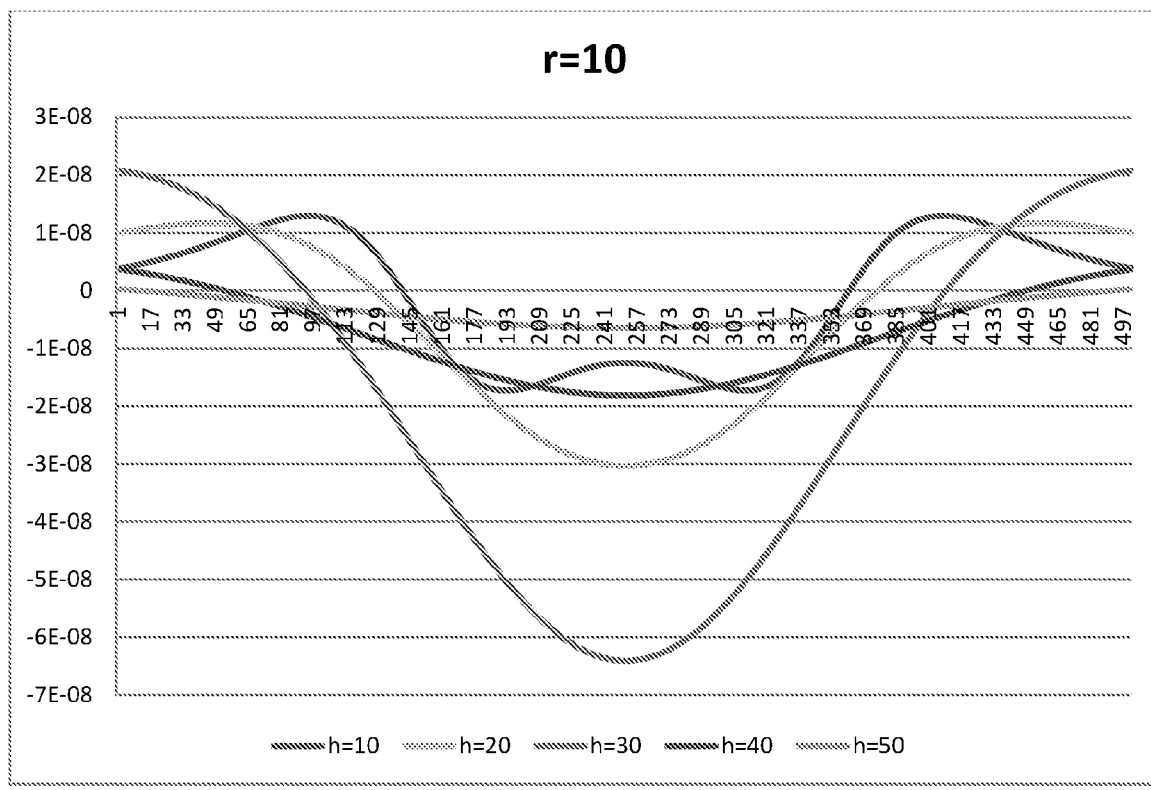

FIGS. 7a and 7b show graphs of the second derivative of the results obtained for different "r" values of the integral of function [VI] with the measures in FIG. 6 according to "D". FIG. 7a is a plotted graph for the case where the radius of the coil (50) "r" is 0.1 unit, and FIG. 7b is where it is 10 units. In both figures, as the target gets closer to the coil, the results appear to distort due to the direction of the resultant vectors. If the target depth is greater than the radius "r", the distortion is reduced because the composition of the effects is in the same direction. When numerical results are compared for the zero points of the second derivative, the expressions for depth should be as in the following table.

| Actual (h) | computed for r = 0.1 (h) | calculated for r = 10 (h) |
|---|---|---|
| 10 | 9.38 | 22.57 |
| 20 | 19.64 | 25.32 |
| 30 | 29.69 | 32.49 |
| 40 | 39.96 | 41.14 |
| 50 | 50.00 | 50.00 |

All values in the table are scaled by the factor obtained for the depth of 50 units.

As can be seen in the table, the larger the depth per radius ratio, the better the result. This means that the final depth measurement may require a correction in which the radius is a parameter, or it may work by accepting the error for distant targets at a certain distance. Because of the geometric structure, the magnetic field becomes more complex in the targets near the coil, and it is difficult to express the magnetic field analytically in this geometry.

Because of the approach of the target to the coil geometry characterized by the radius, it is also possible to correct this with an appropriate analytical correction function or a discrete interpolated correction function calibrated by sampling. In the context of the invention, numerical methods have been provided to correct not only the errors caused by the diameter but also other distortions by applying interpolation to the sampled curve.

All calculations expressed in single dimension in the explanations can be applied on the ground which has a two dimensional surface. It is known that only in the calculation made up of the X axis, the first derivative of V(x) will be equal to zero at the points where the coil (50) is exactly on top of target (60) or approaching to the plus/minus infinity. Here, zero value will correspond to a finite value which is the center of the position of target (60) is located. In the method of the present invention, when the calculation is performed on a two-dimensional ground, the finite point at which the first derivative of the signal is zero or the axis at which the centroid of these points where the coil (50) is exactly on the target (60), i.e., the center of the horizontal ground plane in the Cartesian coordinate system (X, Y) a center of symmetry. When the distances to this center in the depth calculation are expressed as the values of a two dimensional array, the third dimension can be expressed as V (x, y), which will consist of the metal detection signal values taken for each position at a certain resolution. In this way, a depth will form a closed geometric section where the second derivatives of V (x, y) for x and y are equal to zero. The average of the horizontal distance of the points of this geometric structure to the specified center can be expressed as the previous "h" which characterizes the distance of the coil (50) from the target (60).

It is possible to characterize the linearity distortion due to the specified effects with an $h_c = G(h)$ correction function. Here, "h" is the value calculated from the derivatives and "$h_c$" is the value corrected according to the coil. The correction function will be in the form of a discretized curve that will be created specially with the sampled test values. This curve to the desired value "h" as a result can be practically obtained by interpolating the measured value between the test values.

This value can be displayed on a screen (32) capable of graphical plotting or directly on a numerical display (31).

The depth calculation method used by the detector of the invention is realized in two ways in practice. One of these is the calculation of the depth of detail by using the signal magnitude matrix and derivative matrices, and it is the presentation on the graph to the user. Another possibility of the application, the graphics processing/display unit (30) does not express the whole matrix and just dynamically determines the positions which the derivatives are zero for one or multiple search head (11) swing and makes the calculation based on those, and consequently delivering quickly to the user a less accurate analysis result. If sensitivity is important for the user, it is possible to use the first method, and if not, the second method. In the latter method, a simpler system can be realized by using a processor with less resources, more economical and less energy, since there is no need for a high memory and processing as in the first method.

The invention claimed is:

1. A metal detector for calculating a depth of a target, comprising:
    a search head, and
    a signal processing system connected to said search head for providing transmission of metal signal and receiving and processing of received metal signals,
    wherein it comprises an optical flow sensor for determining horizontal movement of said search head using an optical flow method,
    a positional tracking unit having a height sensor for measuring height of the search head from the ground and an Inertial Measurement Unit comprising a gyroscope, accelerometer and magnetometer for detecting angular displacements resulting from axial movements, and wherein said signal processing system is configured to realize the steps of:
    collecting location information on the ground of the search head by means of the optical flow sensor, simultaneously with the collection of presence/signal intensity information on the target metal and the presence/signal intensity information via a metal detection unit of the metal detector;
    detecting and correcting height variations due to the user's hand movements and ground irregularities with the height sensor during the collection of position information, and use in calculations;
    detecting and correcting-angular changes caused by hand movements of the user during the collection of position information with the Inertial Measurement Unit;
    processing the presence/signal intensity information and corrected position information into a target metal-position matrix where said matrix is a two-dimensional matrix which rows and columns represent a plurality of horizontal positions of the search head and values at intersect points represent presence/signal intensity information at the corresponding horizontal position;

formatting first and second derivative tables according to the plurality of horizontal positions over the target-position matrix;

determining zero points in the first and second derivatives according to the plurality of the horizontal positions;

calculating a vertical distance of the target depth with respect to the search head by taking the distances of the zero point and the difference of the two distances obtained by taking the first derivative zero point as the reference position;

subtracting the height of the search head, which is detected by the height sensor, from the vertical distance, thereby finding the target depth under the ground.

2. The metal detector as recited in claim 1, wherein processing metal data comprises completing a missing data in the target metal-position matrix by interpolation.

3. The metal detector as recited in claim 1, wherein said signal processing system is further configured to use an analytical or numerical compensation, approximation, convergence or correction function to correct geometric errors in the process.

4. The metal detector as recited in claim 1, further comprising an external screen or internal display configured to visually present the depth information in graphical form.

5. The metal detector as claimed in claim 4, wherein the device is configured to utilize mobile phone, portable PC and derivative mobile technologies for calculations or presentations.

6. The metal detector as claimed in claim 1, further comprising a cold mirror filter and an infrared illumination element configured to prevent erroneous measurements by the optical flow sensor due to ambient light.

* * * * *